356-33 SR
7/1/86 OR H 000,076

United States Statutory Invention Registration [19]

[11] Reg. Number: H76
[45] Published: Jul. 1, 1986

Cotterman

[54] INSTRUCTIONAL POLARISCOPE

[75] Inventor: Bruce W. Cotterman, West Point, N.Y.

[73] Assignee: The United States of America as represented by the Secretary of the Army, Washington, D.C.

[21] Appl. No.: 465,377

[22] Filed: Feb. 10, 1983

[51] Int. Cl.[4] ..... G01B 11/18; G01J 4/00
[52] U.S. Cl. ..... 356/33; 356/366; 73/800
[58] Field of Search ..... 356/32, 33, 364, 365, 356/366, 367, 368, 369; 73/800, 856

[56] References Cited

U.S. PATENT DOCUMENTS

| | | | |
|---|---|---|---|
| 3,177,761 | 4/1965 | Redner | 88/14 |
| 3,218,912 | 11/1965 | Minoura et al. | 356/33 |
| 3,243,819 | 3/1966 | Chapman | 356/33 |
| 3,293,908 | 12/1966 | Chapman | 356/33 |
| 3,373,652 | 3/1968 | Flader | 88/14 |
| 3,549,259 | 12/1967 | Kzatchko | 356/366 |
| 4,233,847 | 11/1980 | Walker | 356/33 |

*Primary Examiner*—S. C. Buczinski
*Assistant Examiner*—Linda J. Wallace
*Attorney, Agent, or Firm*—John H. Raubitschek; Arthur I. Spechler

[57] ABSTRACT

An instructional polariscope which is easily disassembled, reassembled, calibrated and operated in the classroom by individual students for the purposes of teaching and demonstrating the interoperation of components of a polariscope and the principles of photoelasticity. This polariscope can be assembled for use as either a plane or a circular polariscope and employs a reflector which allows use of an external light source.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INSTRUCTIONAL POLARISCOPE

The invention described herein may be manufactured, used and licensed by or for the Government for governmental purposes without the payment to me of any royalty thereon.

BACKGROUND OF THE INVENTION

This invention relates generally to plane and circular polariscopes and, more particularly to a relatively small, rugged, inexpensive and light-weight componentized polariscope which can be easily transported, disassembled, reassembled, calibrated and operated by individual students for instructional purposes.

DESCRIPTION OF THE PRIOR ART

Polariscopes for demonstrating the theory of photoelasticity and analysing stresses in birefringent materials with polarized light are well known in the art. For example, U.S. Pat. No. 3,177,761 granted to S. Redner on Apr. 13, 1965 and U.S. Pat. No. 3,373,652 granted to F. E. Flader on Mar. 19, 1968, both disclose the basic cooperation of elements for the plane and the circular polariscope. In each case, however, as with other examples of presently available polariscopes, the devices are self-contained, pre-calibrated, somewhat cumbersome and are not easily disassembled and reassembled. Also, many of the presently available poloariscopes are automated so that adjustments and operations with the polariscope are accomplished through the manipulation of knobs, buttons or levers. This reduces the instrument to little more than a "black box" and does not allow for an appreciation of the interoperation of the polariscope's components.

In an academic environment, where the primary objective is to instruct students, there is a need for a light-weight, low-cost, rugged, easily moved polariscope of simple construction which can be calibrated, assembled and disassembled without difficulty. Additionally, of course, these characteristics are desirable with as little sacrifice in accuracy of the polariscope as possible. More specifically, a polariscope which can be easily assembled and disassembled, and thus allow accessibility to the components of the device, would allow the student to observe the physical phenomenon of photoelasticity while learning the application of the mathematical theory. This would be done in a meaningful way through his or her actual construction, calibration and operation of the polariscope. Further, a light-weight inexpensive polariscope would allow a higher ratio of polariscopes per student population. This last factor is particularly important when it is recognized that a polariscope typically has a reduced field which permits viewing by only a few persons at any one time.

Other needs, which may be peculiar to the academic environment, have not been met by presently available polariscopes which are expensive, bulky and not easily assembled or disassembled. For instance, it would be very difficult, if not impossible, to allow students to borrow such polariscopes for study outside the classroom. Moreover, the cost of such a program would likely be prohibitive. On the other hand, a light-weight inexpensive polariscope with load cell could satisfy these needs. Furthermore, with an easily assembled and disassembled polariscope, the polariscope, itself, can be used for examination purposes to test the students' understanding and operation of the device.

Although the theory being taught is basically complex in its nature, the simplicity of an instructional aid can help overcome this complexity. Also, in a classroom environment where the device must be repeatedly used by different students, a polariscope of rather simple construction is desirable. Elimination of the need for an internal light source and employment of an uncomplicated load cell are but two examples of ways in which the overall construction of the polariscope can be simplified.

SUMMARY OF THE INVENTION

A preferred embodiment of the present invention includes a base on which a polarizer and an analyzer can be operationally mounted to function as a plane polariscope. The preferred embodiment also permits the mounting of two quarter-wave plates between the polarizer and analyzer in order to convert the plane polariscope into a circular polariscope. The deceptive simplicity of the invention is manifested by the fact that each component of the polariscope can be selectively and sequentially mounted and operationally rotated on the base to thereby dramatically demonstrate the theory of photoelasticity. Also, the incorporation of a reflector, operatively associated with the base, obviates the need for an internally integrated light source. Further, the use of a rudimentary and uncomplicated load cell adds to overall simplicity of the invention. In sum, the present invention represents a rugged, low-cost and mobile polariscope which operates within the acceptable degree of accuracy necessary for effective demonstrational and instructional purposes. In deed, the accuracies obtained with the present invention permit an analysis of strength of materials for many purposes.

The novel features of this invention, as well as the invention itself, both as to its organization and operation will be best understood from the accompanying drawings, taken in conjunction with the accompanying description, in which similar reference characters refer to similar parts, and in which:

DESCRIPTION OF THE PREFERRED EMBODIMENTS

Figure 1:
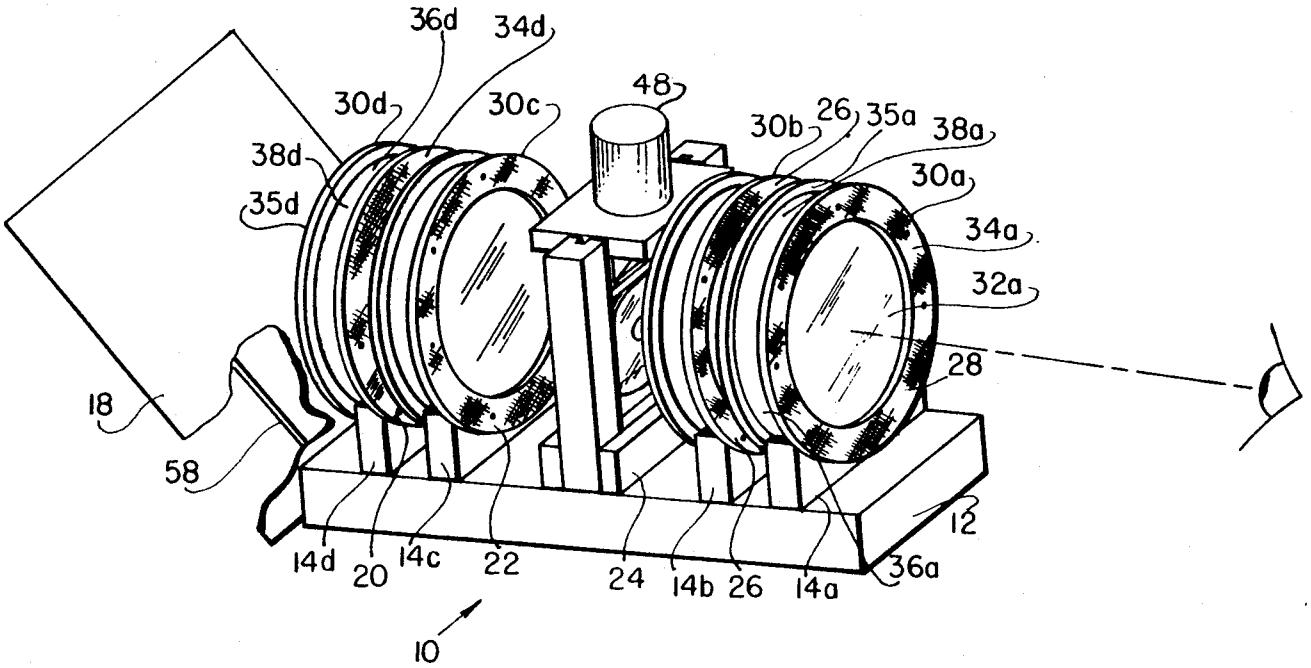
FIG. 1 is a perspective view of the instructional polariscope with a portion broken away for the purpose of clarification.

Referring to FIG. 1, it is seen that the operational components of instructional polariscope 10 are a reflector 18, a polarizer 20, a polarizer quarter-wave plate 22, a load cell 24, an analyzer quarter-wave plate 26, and an analyzer 28. Persons skilled in the art will quickly recognize the configuration of polarizer 20, polarizer quarter-wave plate 22, analyzer quarter-wave plate 26 and analyzer 28 as being typical for a circular polariscope. Removal of polarizer quarter-wave plate 22 and analyzer quarter-wave plate 26 converts the instructional polariscope 10 into the typical configuration for a plane polariscope. As will become more apparent in subsequent discussions, both the plane and the circular polariscope configurations are necessary for instructional purposes and the ability of the instructional polariscope 10 to be easily transformed from one configuration to the other is a salient feature of the present invention.

Figure 2:
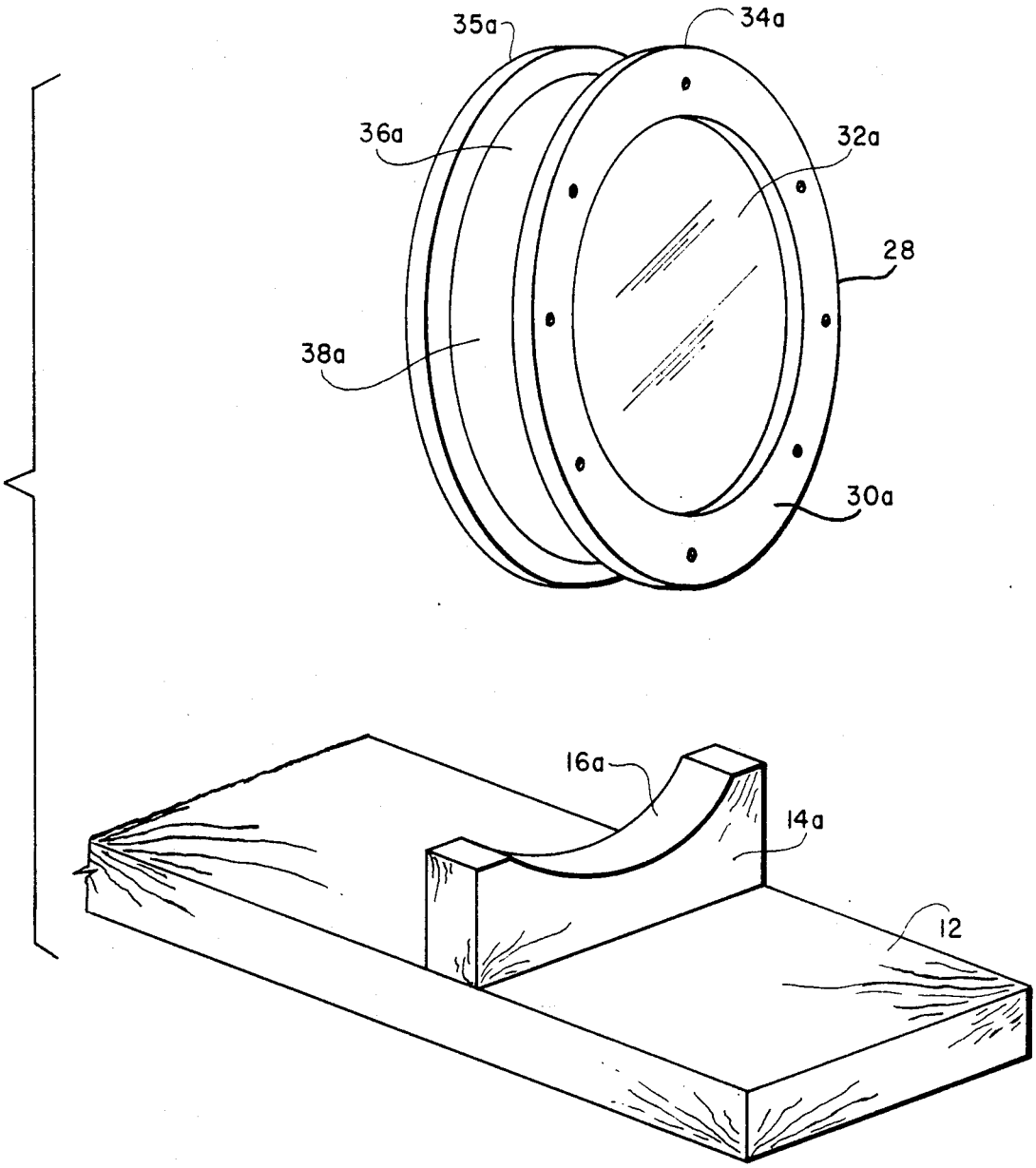
FIG. 2 is a perspective fragmentary view showing certain details of the polariscope of FIG. 1.

In FIG. 1, the instructional polariscope 10 is shown fully assembled and it can be seen that the polariscope 10 achieves it structional integrity from a base 12 on which the supports 14*a, b, c,* and *d* are fixedly attached by any suitable means, such as glue, nails or screws (attachment means not shown). A better appreciation of the supports 14*a, b, c,* and *d,* which are all substantially similar, may be had by referring to FIG. 2 in which the support 14*a* is shown by itself. As shown in FIG. 2, support 14*a* is formed with a concave surface 16*a* on the edge opposite from its edge of attachment with the base 12. Also, support 14*a* is mounted on base 12 so that its length-wise axis is substantially perpendicular to the length-wise axis of base 12. Again, it should be recognized that the supports 14*a, b, c,* and *d* are substantially similar to each other. They each have concave surfaces similar to surface 16*a,* and are each fixedly attached in a similar manner and orientation to the base 12. The subsequent discussion of instructional polariscope 10 will show that this arrangement of the supports 14*a, b, c* and *d* aligns analyzer 28, analyzer quarter-wave plate 26, polarizer quarter-wave plate 22 and polarizer 20, which are each respectively mounted on supports 14*a, b, c* and *d,* for cooperative association so that a beam of light can be directed through the instructional polariscope 10. Before proceeding, it should be noted, that wood is a particularly good material for construction of the base 12 and the supports 14*a, b, c* and *d.* Of course, any relatively strong light-weight materials can be used.

Turning now to a more detailed description of the components of the instructional polariscope 10, attention will first be given to the analyzer 28. As is best shown in FIG. 2 the analyzer 28 comprises a lens 32*a* which is mounted in a frame 30*a.* In the preferred embodiment lens 32*a* is made of a light polarizing material such as Linear Polarizer HN—32 Neutral Linear 0.030" thick. Also usable for this purpose are the materials HN—22 and HN—55 and, for certain conditions, it may be preferred to use these materials having thicknesses lesser or greater than 0.030". For instructional purposes, however, the HN—32 0.030" thick seems preferable since it sufficiently resists the misuse and scratching frequently encountered in the classroom environment. In the preferred embodiment, lens 32*a* is made by cutting the appropriate material, with any suitable device, such as scissors, into a circular shape. The lens 32*a* is then fixedly mounted in frame 30*a* by any of several appropriate means, all of which are well known in the art.

Frame 30*a* comprises an annular rim 34*a* which is fixedly mounted on a ring shaped spacer 38*a* by any suitable means such as nails, screws or glue. An annular band 35*a,* which is substantially similar to rim 34*a,* is mounted, in a like manner, on the opposite side of spacer 38*a* so that rim 34*a* and band 35*a* are substantially parallel to each other. When assembled in this manner, frame 30*a* is formed in the shape of a ring and light can pass through the hole of the frame 30*a.* As previously indicated, lens 32*a* is mounted on frame 30*a* and should be so mounted to completely cover the hole in the ring-shaped frame 30*a.* One method for mounting lens 32*a* would be to clamp the preiphery of lens 32*a* between annular rim 34*a* and spacer 38*a.* As can also be seen in FIG. 2, the diameter of spacer 38*a* is sufficiently smaller than the diameters of rims 34*a* and 34*b* so that a groove 36*a* is formed at the periphery of frame 30*a.*

The cooperation of structure between analyzer 28 and support 14*a* can be seen by referring to FIG. 1 and FIG. 2. As is readily apparent from reference to these Figs., analyzer 28 should rest on support 14*a* and at the same time be free to rotate about an axis perpendicular to the surface of lens 32*a.* To accomplish this, the width of spacer 38*a* needs to be slightly greater than the width of support 14*a* and the radius of curvature for the circumference of spacer 38*a* should be substantially the same as the radius of curvature of the concave surface 16*a* on support 14*a.* With the described compatibility of these dimensions, analyzer 28 will rest on Support 14*a,* as seen in FIG. 1, and be free for rotation about an axis perpendicular to the surface of lens 32*a* while at the same time being restrained from tipping off support 14*a* by the action of the peripheries of rim 34*a* and band 35*a* against the respective sides of support 14*a.*

Polarizer 20 is assembled in substantially the same manner as is analyzer 28. The materials used, and corresponding dimensions are substantially the same in all respects. In the case of polarizer 20, an annular rim 34*d,* an annular band 35*d* and a spacer 38*d* are assembled to form a frame 30*d* having a grove 36*d* which interacts with support 14*d* in substantially the same manner as analyzer 28 interacts with support 14*a.* Also, the lens material for polarizer 20 is the same material used for lens 32*a* of analyser 28. Indeed, analyzer 28 and polarizer 20 of instructional polariscope 10 are interchangeable. Accordingly, a more detailed description for assembly of polarizer 20 need not be given. It is important, however, to recognize that, by convention, the light polarizing material closest to the light source is normally referred to as the polarizer 20 and the light polarizing material farthest from the light source is normally referred to as the analyzer 28.

Frame 30*c* for polarizer quarter-wave plate 22 and frame 30*b* for analyzer quarter-wave plate 26 are both manufactured in substantially the same manner and have substantially the same dimensions as do frame 30*d* for polarizer 20 and frame 30*a* for analyzer 28. Further, their interactions with the supports 14*b* and 14*c* are substantially similar to the respective interaction of analyzer 28 and polarizer 20 with the supports 14*a* and 14*d.* There is, however, one important difference. For both the polarizer quarter-wave plate 22 and the analyzer quarter-wave plate 26, the respective lenses are made of a material known in the art as quarter-wave plate. For the purposes of this invention, the Polaroid ¼ Wave 140±20 mm Retarder as manufactured by the Polaroid corp. is a suitable material.

In FIG. 1 it can be seen that the supports 14*a,* 14*b,* 14*c* and 14*d* are mounted on base 12 with sufficient spacing to allow independent manual rotation of the polarizer 20, polarizer quarter-wave plate 22, analyzer quarter-wave plate 26 and analyzer 28. For most efficient operation of the instructional polariscope 10, however, such spacing should be minimized in order to reduce the chance that ambient light will drown out the photoelastic effect. Also, sufficient distance is provided between support 14*b* and support 14*c* for the mounting of load cell 24 on base 12.

Figure 3:
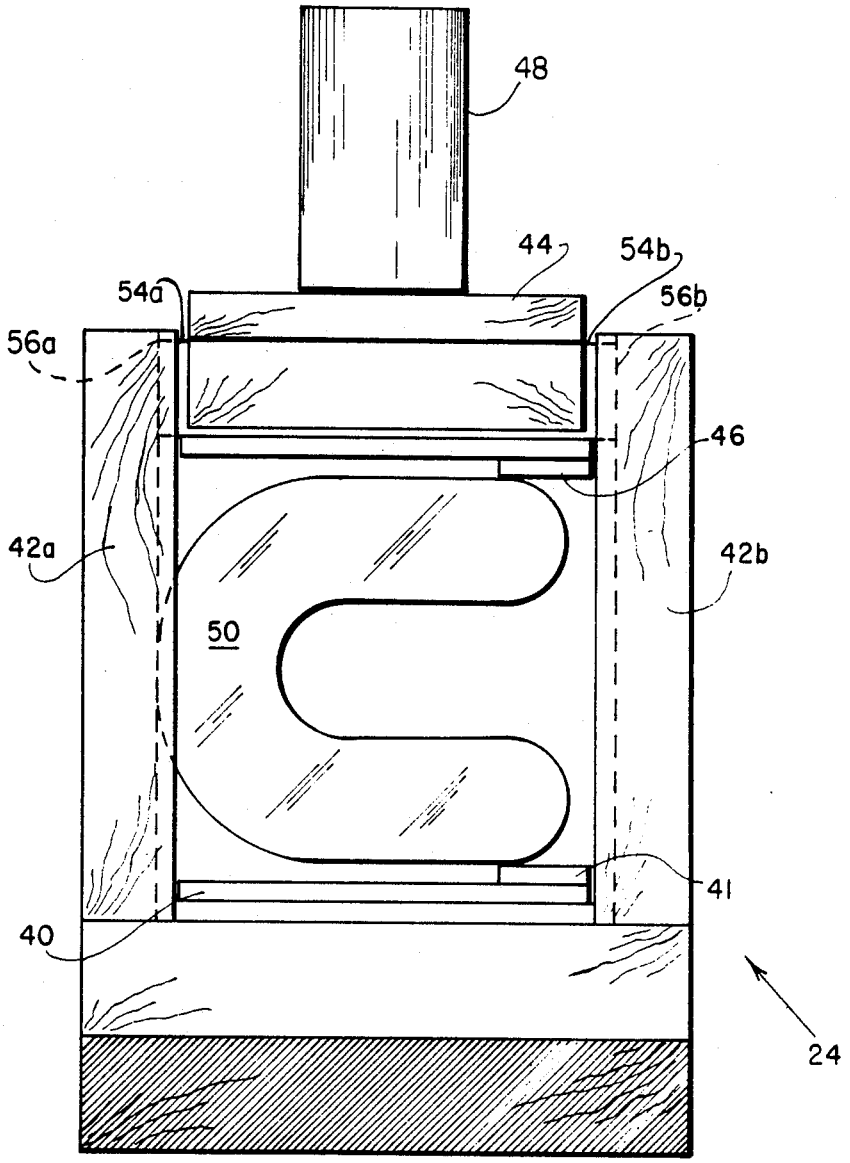
FIG. 3 is an exploded front elevational view of the load cell of the polariscope of FIG. 1.

Fixedly mounted substantially in the center of base 12 is the load cell 24. FIG. 3 shows an exploded view of this particular component of instructional polariscope 10 and can be referred to during the description of load cell 24. Load cell 24 comprises a plate 40 on which the specimen 50 to be tested can be placed. In order to prevent deformation of plate 40 during a loading operation it may be necessary to manufacture plate 40 from a metallic material. FIG. 3 also shows a stress pad 41 which is mounted on plate 40 and which extends only part way across the width of load cell 28. As shown in FIG. 3, use of stress pad 41 will cause a concentrated load to be applied to a specimen 50 when load cell 24 is operated. As suggested, stress pad 41 need not be used and plate 40 may, in fact, extend across the width of load cell 24. In such configuration a distributed load would be applied to a specimen 50. The particular configuration for plate 40, and the use of stress pad 41, depends entirely on the particular desires of the operator. At this point it should be mentioned that specimen 50 can be formed into any desired shape. The horseshoe shape for specimen 50, as shown in FIG. 3, is only one example of the shape into which specimen 50 may be formed. Although specimen 50 may be of many shapes it is limited to only one type of material. For use with the instructional polariscope 10 the specimen 50 must be made of a birefringent material.

Returning to the structure of load cell 24, it is seen in FIG. 3 that on opposite sides of plate 40 are the upright **42*a* and the upright 42*b*. Upright 42*a* and 42*b* are fixedly attached to base 12 and are respectively formed with notches 56*a* and 56*b* to operationally receive platform 44. As can be best understood by reference to FIG. 3, platform 44 is formed with guides 54*a* and 54*b* which are on opposite ends of the platform 44 and are positioned to be operatively received simultaneously by notch 56*a* on upright 42*a* and by notch 56*b* on upright 42*b*. Depending on the shape of specimen 50, and the type load to be applied to specimen 50, platform 44 may be fitted with a stress pad 46 which is positioned on platform 44 for applying a concentrated load on specimen 50. Of course, for the same reason previously discussed in connection with plate 40, stress pad 46 can be eliminated. In this case platform 44, which is sufficiently strong to prevent deformation during loading operations, may be employed to affect a distributed load on specimen 50. In either case, the platform 44 is used primarily to transfer the force of load 48 to the specimen 50. Although FIG. 3 and FIG. 1 show load 48 as a metal weight, it should be appreciated that load 48 can be almost anything. For instance, in the classroom, where it is anticipated this invention will most likely be used, text books may be used as load 48**.

Load cell 24 must be positioned on base 12 to allow polarized light from polarizer 20 to pass through specimen 50 and then pass on to analyzer 28. This must be so regardless whether the specimen 50 is stressed by the application of force from load 48.

Referring now to FIG. 1, the reflector 18 is seen attached to the base 12 for reflecting concentrated light from an external source (not shown) through the polarizer 20 and then sequentially through polarizer quarter-wave plate 22, specimen 50, analyzer quarter-wave plate 26 and analyzer 28. The external light source (not shown) can be any of several devices. For example, in a classroom environment, the light source may be ceiling lights, desk lamps or hand-held lights. The only requirement is that the light source be of sufficient intensity to allow perception of the reflected beam after it has passed through the instructional polariscope 10.

Reflector 18 can be of any material that is capable of reflecting light. Experimentation indicates that a plain white paper sheet is perhaps the most efficacious material for the classroom environment. Other reflective materials, however, may be used. Regardless, the reflector 18 is detachably mounted on the end of base 12 adjacent polarizer 20 and inclined relative to base 12 to maximize the amount of reflected light passing through instructional polariscope 10. The means for so attaching reflector 18 to base 12 may vary depending on the particular needs of the operator. It has been found that a simple wire structure 58, as shown in FIG. 1, on which reflector 18 can be rested is sufficient for most purposes.

The use and operation of instructional polariscope 10 will be best understood by discussing the preferred manner for assembly and calibration of the device. Such discussion starts with the instructional polariscope 10 completely disassembled.

Structure 58 is afixed to the end of base 12 nearest to support **14*d* by any of several means for attachment, all well known in the appropriate art. Reflector 18 is then placed on structure 58 to allow the light from an external source, such as a ceiling light, to reflect from reflector 18 and thereafter pass above base 12 and along an axis which is generally parallel to the length wise axis of base 12. The operator now holds polarizer 20 and looks at the glare off of a flat surface, such as a waxed floor, through lens 32*d* of polarizer 20. The polarizer 20 is then rotated until the glare is minimized. With the glare minimized, the axis of polarization of polarizer 20 is identified as being perpendicular to the plane of the flat surface from which the glare was perceived. While holding polarizer 20 in this orientation, the axis of polarization of polarizer 20 is fixed by placing a piece of tape on the annular rim 34*d* of frame 30*d* so that a line drawn between the tape and the center of lens 32*d* will define the axis of polarization. Polarizer 20 is now placed on support 14*d* with the axis of polarization of polarizer 20 perpendicular to the top surface of base 12**.

After polarizer 20 has been placed on support **14*d* on base 12, as described above, analyzer 28 is placed on support 14*a* on base 12. The operator now looks at reflector 18 through analyzer 28 and polarizer 20. Analyzer 28 is then rotated until the light reflected from reflector 18 does not pass through both polarizer 20 and analyzer 28. A dark field is thus obtained and, as is well known by those skilled in the art, A dark field indicates that the axis of polarization of analyzer 28 is crossed, i.e. perpendicular, to the axis of polarization of polarizer 20. Again, tape can be used to identify the axis of polarization. For analyzer 28 this is done by placing a piece of tape on annular rim 34*a* of frame 30*a* so that the tape and the center of lens 32*a* will define the axis of polarization of the analyzer 28. Instructional polariscope 10** is now calibrated for use as a plane polariscope.

Specimen 50 can now be placed in load cell 24 between plate 40 and platform 44. When specimen 50 is unstressed it will not affect the passage of light through instructional polariscope 10, and with polarizer 20 crossed with analyzer 28 there will still be a dark field. If a load 48 is placed on load cell 24, however, stresses will develop in specimen 50. As is well known in the art, polarized light from polarizer 20 will pass through any particular point on a stressed specimen 50 only along principal axes of stress. Thus, components of the polarized light are generated which are perpendicular to the axis of polarization of polarizer 20. These components are then parallel with the axis of polarization of analyzer 28 and will pass through analyzer 28. The result is that a viewer will see bands of constant stress differences in specimen 50 which are known in the art as "isochromatic fringes". This configuration is typical of the operation of a plane polariscope.

In the plane polariscope, as just described, it is apparent that where the axes of principal stress are parallel to the axis of polarization of polarizer 20 no component perpendicular to the axis of polarization of polarizer 20 will be generated. In these instances the light will not pass through analyzer 28. Consequently, along the locus of such points the viewer will perceive dark bands which are known in the art as "isoclinics". For stress analysis purposes, isoclinics should not be confused with the fringes. Therefore, elimination of isoclinics is desirable. Fortunately this can be done by introducing an analyzer quarter-wave plate 26 and a polarizer quarter-wave plate 22 into the instructional polariscope 10 to make a configuration known as a circular polariscope.

To configure instructional polariscope 10 as a circular polariscope, the plane polariscope with dark field, as previously discussed, is assembled. Specimen 50, if used with the plane polariscope configuration, should be removed. Polarizer quarter-wave plate 22 is mounted on support 14*c*. Because of the effect polarizer quarter-wave plate 22 has on the polarized light coming from polarizer 20, it is possible that the polarizer quarter-wave plate 22 will generate components of light which will pass through analyzer 28. Polarizer quarter-wave plate 22 is therefore rotated until there is again a dark field when looking through instructional polariscope 10. Tape is again used to identify an axis. This time a piece of tape should be placed on the annular rim 34*c* of frame 30*c* so that the tape and the center of lens 32*c* define an axis parallel to the axis of polarization of polarizer 20 and perpendicular to the axis of polarization of analyzer 28. As indicated earlier, this relative orientation will preserve the dark field. For reasons to be subsequently discussed, another piece of tape should be placed $\pi/4$ radians clockwise (counterclockwise) from the piece of previously placed tape.

With polarizer 20, polarizer quarter-wave plate and analyzer 28 oriented on base 12 to produce a dark field, analyzer quarter-wave plate 26 is next placed on support 14*b* on based 12. For the same reasons discussed with regard to polarizer quarter-wave plate 22, analyzer quarter-wave plate is rotated until a dark field is realized. As with the other components, tape is again used to identify the axis of analyzer quarter-wave plate 26 which casues the dark field. Also, tape is used to identify a $\pi/4$ radian rotation counterclockwise (clockwise) from the axis which causes the dark field. If polarizer quarter-wave plate 22 is now rotated $\pi/4$ radians clockwise (counterclockwise) and analyzer quarter-wave plate is rotated $\pi/4$ radians counterclockwise (clockwise) the instructional polariscope 10 will then be configured as a circular polariscope. Specimen 50 can then be mounted in load cell 24 and stressed as previously discussed. With the circular polariscope configuration, however, the unwanted isoclinics will be eliminated.

Regardless whether the configuration for instructional polariscope 10 is for a plane or a circular polariscope, it should be recognized that the present invention lends itself to construction with rugged, easily machinable and inexpensive materials. For example, many of the structured portions of instructional polariscope 10 can be manufactured from wood, composition board and wire. These materials also help in making the present invention relatively light-weight and mobile. For these reasons the instructional polariscope can be easily used by as few as one or two individuals either in or outside of the classroom. In a classroom environment, it can be appreciated that the instructional polariscope 10 is easily employed on a desk or table top.

I claim:

1. A dismountable instructional polariscope for analyzing stresses in a birefingent specimen, said polariscope being adapted to be dismounted without tools, comprising:

a base having a viewing end and a light-source end opposite said viewing end, a load cell fixedly mounted on said base for holding said specimen, means associated with said load cell for creating stresses in said specimen, a polarizer comprising a first annular frame formed with a first peripheral groove and having a first hole at the center of said first annular frame, and a lens of polarizing material attached to said first annular frame for covering said first hole, an analyzer comprising a second annular frame formed with a second peripheral groove and having a second hole at the center of said second annular frame, and a lens of polarizing material attached to said second annular frame for covering said second hole, a first support, fixed to said base intermediate said light-source end and said load cell, and formed with a concave surface to slidably and detachably receive said first peripheral groove of said polarizer for rotation thereon solely by hand, and to support said polarizer thereon solely by gravity, a second support, fixed to said base intermediate said viewing end and said load cell, and formed with a concave surface to slidably and detachably receive said second groove of said analyzer for rotation thereon solely by hand, and to support said analyzer thereon solely by gravity, said base, said load cell, said annular frames, and said supports comprising wood, and a light reflector, detachably disposed solely by gravity adjacent said light-source end of said base, for directing light through said polarizer, said specimen, and said analyzer.

2. A dismountable instructional polariscope as claimed in claim 1 further comprising:

a polarizer quarter-wave plate comprising a third annular frame formed with a third peripheral groove and having a third hole at the center of said third annular frame, and a lens of wave-plate material attached to said third annular frame and covering said third hole, an analyzer quarter-wave plate comprising a fourth annular frame formed with a fourth peripheral groove and having a fourth hole at the center of said fourth annular frame, and a lens of wave-plate material attached to said fourth frame for covering said fourth hole, a third support, fixed to said base intermediate said polarizer and said load cell, and formed with a concave surface to slidably and detachably receive said third peripheral groove of said polarizer quarter-wave plate for rotation thereon solely by hand, and to support said polarizer quarter-wave plate thereon solely by gravity, a fourth support, fixed to said base intermediate said analyzer and said load cell, and formed with a concave surface to slidably and detachably receive said fourth peripheral groove of said analyzer quarter-wave plate for rotation thereon solely by hand, and to support said analyzer quarter-wave plate thereon solely by gravity, and said polarizer quarter-wave plate and said analyzer quarter-wave plate receiving light from said light source when disposed on said third and fourth supports, respectively.

3. A dismountable instructional polariscope as claimed in claim 1 wherein:

said light reflector, when disposed on said base, is disposed to receive light from a source external to, and unsupported by, said polariscope.

* * * * *